United States Patent [19]
Aitken et al.

[11] Patent Number: 5,273,837
[45] Date of Patent: Dec. 28, 1993

[54] SOLID ELECTROLYTE FUEL CELLS

[75] Inventors: Bruce G. Aitken; Margaret K. Faber, both of Corning; Thomas D. Ketcham, Big Flats; Dell J. St. Julien, Watkins Glen, all of N.Y.

[73] Assignee: Corning Incorporated, Corning, N.Y.

[21] Appl. No.: 996,140

[22] Filed: Dec. 23, 1992

[51] Int. Cl.$^5$ .............................................. H01M 8/10
[52] U.S. Cl. ........................................ 429/30; 429/32; 429/34
[58] Field of Search ........................... 429/30-33, 429/34, 193; 204/410, 421; 501/104, 105, 102

[56] References Cited

U.S. PATENT DOCUMENTS

| | | | |
|---|---|---|---|
| 4,476,196 | 10/1984 | Poeppel et al. | 429/32 |
| 4,476,198 | 10/1984 | Ackerman et al. | 429/32 |
| 4,510,212 | 4/1985 | Fraioli | 429/30 |
| 4,812,329 | 3/1989 | Isenberg | 429/33 X |
| 4,827,071 | 5/1989 | Hazbun | 585/443 |
| 4,883,497 | 11/1989 | Claar et al. | 429/33 X |
| 4,888,254 | 12/1989 | Reichner | 429/31 |
| 4,988,582 | 1/1991 | Dyer | 429/30 |
| 5,049,459 | 9/1991 | Akagi | 429/33 |
| 5,089,455 | 2/1992 | Ketcham et al. | 501/104 |
| 5,145,754 | 9/1992 | Misawa et al. | 429/32 |

FOREIGN PATENT DOCUMENTS

WO88/08045 10/1988 World Int. Prop. O. .

OTHER PUBLICATIONS

"Ceramics in Fuel Cells", K. Kendall, Ceramic Bulletin, vol. 70, #7, 1991 pp. 1159-1160.
N. Q. Minh, "High-Temperature Fuel Cells Part 1", Chemtech, Jan., 1991, pp. 32-37.
N. Q. Minh, "High-Temperature Fuel Cells Part 2: The Solid Oxide Cell", Chemtech, Feb., 1991, pp. 120-126.
"Economic Fuel Cells by Design", K. Kendall, 1992 Fuel Cell Seminar, Nov. 29-Dec. 2, 1992, Tucson, Ariz.
"Solid Oxide Fuel Cells—The Next Stage", B. Riley, J. Power Sources, vol. 29 (1990), pp. 223-237.
"Ceramic tape casting for solid oxide fuel (SOFC) electrolyte production", S. V. Phillips et al., Conf. on Ceramics in Energy Applications, Apr., 1990, Sheffield, England.

*Primary Examiner*—Anthony Skapars
*Attorney, Agent, or Firm*—Kees van der Sterre

[57] ABSTRACT

Thermal-shock-resistant fuel cell designs comprising flat and corrugated ceramic sheets combined to form channeled structures, the sheets being provided as thin, flexible ceramics and being particularly effective when used as components of compliant electrolyte substructures incorporating the flexible ceramics with fuel cell electrodes and/or current conductors bonded thereto, are described.

14 Claims, 2 Drawing Sheets

SOLID ELECTROLYTE FUEL CELLS

BACKGROUND OF THE INVENTION

The present invention relates to fuel cells of the type known as solid electrolyte or solid oxide fuel cells, and more particularly to improved materials and methods for making them.

The use of solid electrolyte materials for fuel cells and oxygen pumps has been the subject of a considerable amount of research for many years. The typical essential components of a solid oxide fuel cell comprise a dense, oxygen-ion-conducting electrolyte sandwiched between porous, conducting metal, cermet, or ceramic electrodes. Electrical current is generated in such cells by the oxidation, at the anode, of a fuel material such as hydrogen which reacts with oxygen ions conducted through the electrolyte from the cathode.

Practical power generation units will typically comprise multiple fuel cells of such configuration interconnected in series or parallel with electronically conductive ceramic, cermet or metal interconnect materials. At the present time, the materials of choice for such devices include yttria-($Y_2O_3$) stabilized zirconia ($ZrO_2$) for the electrolyte, nickel-$ZrO_2$ cermet for the anode material, strontium-doped lanthanum manganite ($LaMnO_3$) for the cathode, and strontium-doped lanthanum chromite ($LaCrO_2$) as an electronically conductive layer serving as a cell interconnect material. At sufficient temperatures (e.g., 800° C. or above), zirconia electrolytes can exhibit good ionic conductivity but low electronic conductivity.

Several different designs for solid oxide fuel cells have been developed, including, for example, a supported tubular design, a segmented cell-in-series design, a monolithic design and a flat plate design. All of these designs are documented in the literature, one recent description having been provided by N. Q. Minh in "High-Temperature Fuel Cells Part 2: The Solid Oxide Cell", CHEMTECH, February 1991, pp. 120-126.

The tubular design comprises a closed-end porous zirconia tube exteriorly coated with electrode and electrolyte layers. The performance of this design is somewhat limited by the need to diffuse the oxidant through the porous tube. The segmented cell-in-series design comprises tube-supported and self-supporting variants, with the tube-supported designs being somewhat limited in performance by the need to diffuse the fuel gas through the support tube. The self-supporting variant of the cell-in-series design comprises composite electrode/electrolyte layers which are stacked in series to provide a self-supporting tubular structure. This approach, however, requires relatively thick layers (typically at least 100 microns) which again can limit fuel cell performance.

Flat plate designs offer somewhat higher power density than tubular cell configurations, this type of design being typified by the use of pre-sintered electrolyte sheets. In one subclass of flat plate designs, the electrolyte sheets are coated on opposite sides with anode and cathode layers, coating being accomplished by conventional means such as vapor deposition, slurry coating, or plasma spraying. The electrode coatings thus provided are generally quite thick, typical plasma sprayed anode thicknesses, for example, being on the order of 500 to 1000 micrometers.

To form the final cell structure, the thickly coated electrode/electrolyte sheets thus provided are stacked tightly with current conducting bipolar plates, typically composed of strontium doped lanthanum chromite (such as $Sr_xLa_{(1-x)}CrO_3$ or $Sr_xLaCr_{(1-x)}O_3$ where $x=0.1$ to 0.2). These plates allow for manifolding of the oxidant gas and the fuel. In addition, they serve as collectors of current from across the electrode surfaces (current collectors), and as current-carrying conduits between anode and cathode layers (cell interconnects). Since these bipolar plates are also quite thick (typically 3 to 4 mm in thickness), the resulting flat plate fuel cell structures are essentially rigid and non-compliant.

In a second subclass of flat plate designs, the electrolyte sheet is stacked between porous plates of anode, cathode, and current conducting interconnect material. Each stack is held tightly so as to ensure good electrical contact between the various components. The manifolding is provided not by a bipolar plate but by gas delivery tubes which extend through the structure. As with the other flat plate designs, this design requires the components to be rigid in order to function properly.

Monolithic designs, which characteristically have a multi-celled or "honeycomb" type of structure, offer the advantages of high cell density and high oxygen conductivity. The cells are defined by combinations of corrugated sheets and flat sheets incorporating the various electrode, conductive interconnect, and electrolyte layers, with typical cell spacings of 1-2 mm and electrolyte thicknesses of 25-100 microns. A key advantage of monolithic designs, in addition to the large surface-area-to-volume ratio, is reduced voltage loss from internal electrical resistance, due to the small cell sizes and thin cell components employed.

At the present time, monolithic solid oxide fuel cells are made by tape casting or calendar rolling the various sheet components of the cell, forming the entire cell as a green body, and co-firing the resulting green structure into a unitary or monolithic assembly. This so-called "co-sintering" method of fabrication places significant constraints on both cell design and on the manufacturing process, since the electrolyte, electrode, and interconnect materials must have compatible firing temperatures and similar coefficients of thermal expansion to achieve homogeneous consolidation and to avoid structural defects such as cracking during firing.

It is a principal object of the present invention to provide an improved fuel cell construction, applicable to the fabrication of any of the above fuel cell designs but particularly applicable to multi-celled or "honeycomb" fuel cell structures similar to those of monolithic fuel cells, which avoids many of the difficulties of fuel cell manufacture while providing a cell of improved physical, thermal and electrical properties.

It is a further object of the invention to provide improved methods for the fabrication of fuel cells similar in structure to monolithic fuel cells, but which avoid many of the difficulties associated with prior art co-sintering manufacturing methods.

Other objects and advantages of the invention will become apparent from the following description thereof.

SUMMARY OF THE INVENTION

The present invention encompasses solid electrolyte fuel cell designs incorporating circuit components and/or structural components of improved durability, most importantly, of significantly improved thermal durability. Hence the fuel cells and fuel cell components of the invention are substantially more resistant to thermal stress damage than prior art components or fuel cells of similar composition.

The improved characteristics of the novel fuel cell components of the invention are derived from the use of strong but flexible pre-sintered ceramic sheets for the construction of electrolytes, electrolyte substructures, gas channeling components, and/or other components making up the fuel cell design. Such pre-sintered ceramics, which can be produced and conveniently used as free-standing sheet of high strength but very slight thickness (typically, thicknesses not exceeding about 45 microns), have been found particularly well suited for use as electrolyte layers and/or gas channeling structures, due to their flexibility, strength, and resulting very high thermal shock resistance.

While fuel cell designs incorporating free-standing electrolyte films can be envisioned, the preferred use of flexible pre-sintered ceramic electrolytes is in the fabrication of compliant electrolyte substructures. These substructures employ the flexible electrolyte sheet as a base or support for other fuel cell circuit or structural components attached directly or indirectly thereto. Thus, for example, dense or porous electrode (cathode or anode) layers as well as current conductors (current collectors or cell interconnect layers) can be strongly bonded to these electrolytes by lamination, coating, frit bonding, or the like.

Typical examples of compliant electrolyte substructures which may be provided in accordance with the invention are electrolyte/electrode, electrolyte/conductor, electrolyte/conductor/electrode, and electrolyte/ electrode/conductor combinations. The electrodes and/or current conductors in these substructures may be composed of conventional ceramic, cermet or metal compositions of the kinds known to be useful for fuel cell use. However, due to the flexibility and strength of the electrolyte layers, it is found that electrode or conductor substructures based on and incorporating these flexible electrolyte layers may themselves be somewhat flexible or compliant, so that greatly improved thermal durability can be realized. Such properties are not readily achievable in co-sintered electrode/electrolyte or conductor/electrolyte designs produced in accordance with prior practice.

As with all solid electrolyte fuel cells, the solid electrolyte fuel cells of the invention conventionally include at least an oxidant reservoir, a fuel reservoir, and an electrolyte structure interposed between the oxidant and fuel reservoirs, the latter acting to permit ionic conduction but restrict electronic conduction between the reservoirs. In the present fuel cells, however, the electrolyte structure will typically include an oxygen-ion-conductive electrolyte comprising a thin, flexible, pre-sintered polycrystalline ceramic sheet, preferably a pre-sintered oxide ceramic of high oxygen ion conductivity.

Typically, a major component of the electrolyte sheet will be polycrystalline zirconium oxide ($ZrO_2$), that oxide making up at least about 40% by volume of the material. Zirconia sheets in the thickness range described are particularly preferred because of their anticipated decreased resistance to oxygen-ion flow. It is known in the art that the effective resistance across the electrolyte is linearly proportional to the electrolyte thickness, and that lower resistance yields higher efficiency. Of course, other thin ceramic materials having appropriate ionic conductivities at the operating temperature of the fuel cell may be substituted for zirconia-based electrolyte materials, if desired.

In an important aspect, then, the invention comprises improved compliant electrolyte substructures for solid electrolyte fuel cells. These compliant substructures will comprise an oxygen-ion-conductive electrolyte formed of a self-supporting, flexible, sintered polycrystalline ceramic sheet, this electrolyte sheet being bonded directly or indirectly to at least one other fuel cell component selected from the group consisting of dense or porous electrode layers and current conductors. The electrolytes may also form substructures by contact with or attachment to gas channeling components of the fuel cell, which may comprise rigid cell components or, more preferably, flexible ceramic channeling components as hereinafter more fully described.

In one configuration for such substructures, bonding between the electrolyte sheet and adjoining cell component(s) (circuit elements, cell separators, cell support structures, gas manifolds or the like) will be direct bonding, i.e., bonding without the use of intermediary bonding agents such as glass sealing frits. Hence, bonded electrolyte/electrode, electrolyte/conductor, and electrolyte/channeling component structures having bonding interfaces essentially free of added adhesive interlayer materials may be provided.

In a second configuration, bonding between the electrolyte sheet and adjoining fuel cell components will be achieved by the use of a glass sealing frit of selected composition. Such sealing frits, which are also particularly useful for producing gas-tight seals between gas channeling components of the fuel cell and adjoining structure, include, but are not restricted to, thermally crystallizable rare earth-alkali/alkaline earth-silicate glasses having appropriate thermal expansion and high use temperature properties. Representative compositions comprise, in mole percent, about 0–35% $R_2O$, wherein $R_2O$ consists of alkali metal oxides, 0–40% RO, wherein RO consists of alkaline earth metal oxides and zinc oxide, 7–40% total of $R_2O+RO$, 3–18%. $Ln_2O_3$, wherein $Ln_2O_3$ consists of rare earth metal oxides selected from the lanthanide series of rare earth metals and yttrium, and 53–75% $SO_2$.

Typically, a compliant fuel cell electrolyte substructure such as above described will include at least one of an anode layer, a cathode layer and an current conductor bonded to the supporting electrolyte sheet. More preferably, a bonded combination of at least one metallic, ceramic or cermet current collector and at least one electrode (cathode and/or anode), with the electrode in electrical contact with both the current collector and electrolyte sheet, will be provided.

The invention also provides an improved method for making a compliant electrolyte substructure for a solid electrolyte fuel cell. To achieve this objective an electrolyte precursor sheet comprising a powdered oxygen-ion-conductive ceramic and a binder for the powdered ceramic is first provided. This precursor sheet is then pre-sintered to provide a thin flexible sintered polycrystalline electrolyte sheet consisting essentially of the oxygen-ion-conductive ceramic.

After the electrolyte sheet has been sintered, one or more additional fuel cell circuit components are bonded thereto, such as by lamination, coating, frit bonding, or other layering technique. Such additional component(s) may comprise a fuel cell cathode layer, anode layer, and/or a conductor such as a current collector or interconnect layer for interconnecting cells into a larger power generation unit.

For best results in terms of cell performance, pre-sintered ceramic electrolyte thicknesses will generally not exceed about 45 micrometers, more preferably about 25 micrometers. These thicknesses will not only improve electrolyte compliance and thermal durability, but will also reduce cell resistance and favor efficient cell operation at lower temperatures. Moreover, these thicknesses enable thin electrolyte sheets to be more effectively combined by direct low pressure lamination with pre-sintered dense or porous metallic, cermet, or ceramic electrode or conductor components, as will hereinafter be more fully described.

Inasmuch as the electrolyte and each of the electrode and/or conductor layers can be quite thin in these substructures, some structural flexibility (compliance) can still be realized even with all electrode, collector, and/or interconnect components present. In addition, whether or not substantial flexibility is retained in flat or curved multilayer electrolyte substructures based on these electrolytes, the high strength and excellent bonding characteristics of the electrolytes facilitate the construction of well-bonded fuel cell structures, and particularly high-efficiency fuel cells of channeled or honeycomb configuration, which offer significantly improved thermal durability.

As previously suggested, pre-sintered flexible ceramic sheet may also be utilized to provide gas channeling components of the fuel cell, such as corrugated cell separators for controlling the flow of fuel and oxidant gases therein. Flexible pre-sintered ceramics in thin sheet form have been found particularly well adapted to thermoplastic reforming at temperatures below their melting temperatures, and thus can readily provide corrugated or other curved channeling components for fuel cell construction which are both compliant and highly thermal shock resistant. Further, the desirable bonding characteristics of such components permit the strong attachment thereof to other fuel cell components, either by direct lamination or with the aid of glass sealing frits as above described, such that gas-tight seals with other components can readily be achieved.

Combining the above components into a single thermal-shock-resistant fuel cell design, the invention provides fuel cells comprising a combination of cell circuit and supporting substructures based on flexible pre-sintered ceramic sheets, and which therefore offer significantly improved thermal durability. Included in the cell will be one or more compliant electrolyte substructures such as above described, wherein a flexible oxygen-ion-conductive electrolyte sheet formed of a pre-sintered ceramic oxide constitutes the central element of the substructure.

The electrolyte sheet will again preferably be an oxide sheet which includes zirconia as a major component. In the preferred embodiment, the compliant electrolyte substructure will be an electrolyte/electrode substructure comprising an anode layer bonded to a first surface of the electrolyte sheet and a cathode layer bonded to a second surface thereof.

The corrugated sheets forming the cell separators or channeling components in the fuel cell will also be formed of flexible, pre-sintered ceramic sheets, most preferably of the same order of thickness as the sheets provided in the compliant electrolyte substructures. These may be composed of any sintered ceramic material having the thermal durability required for fuel cell use, and may be sealed into the fuel cell structure by direct lamination (without intermediary bonding agents), or utilizing rare earth silicate sealing glasses as hereinafter more fully described.

As a general rule, good compliance in a sealed fuel cell structure such as above described can be realized if overall thicknesses for the electrolyte/electrode substructures do not exceed about 150 micrometers, more preferably 100 micrometers. These overall thicknesses, which are readily attainable with pre-sintered ceramic electrolytes such as described, should significantly aid in achieving a highly durable and shock resistant channeled fuel cell design. Of course, useful compliance in the fuel cells of the invention depends not only on thickness but also on strength, inasmuch as thin electrolytes or other substructures, if weak, will still break rather than flex under thermal or mechanical stress. Thus the best measure of structural compliance at present appears to be that of the flexibility of the components of the fuel cell.

In the case of pre-sintered ceramic sheets to be used alone as electrolytes or gas channeling elements, for example, sheet flexibility and strength should be at least sufficient to permit bending to an effective curvature radius of 10 cm, more preferably a curvature radius of 3 cm or even 1 cm, without breakage. Likewise, where the substructure to be provided is a somewhat thicker fuel cell component such as an electrolyte/electrode or electrolyte/current collector combination, bending curvature radii below 20 cm, more preferably below 6 cm and most preferably below 2 cm, will be desired.

Minimum flexibility for any of the fuel cell substructures incorporating pre-sintered ceramic sheet should permit bending of the structures to curvature radii not exceeding about 30 cm without failure. This level of compliance should be attainable even for the relatively thick multilayer electrode/electrolyte/electrode substructures provided as herein described. More preferably, curvature radii not exceeding 9 cm, or most preferably 3 cm, will be demonstrated by these multilayer substructures provided an appropriate selection of pre-sintered electrolyte and electrode materials and dimensions is made.

DESCRIPTION OF THE DRAWINGS

The invention may be further understood by reference to the drawings, wherein.

DETAILED DESCRIPTION

Figure 1:
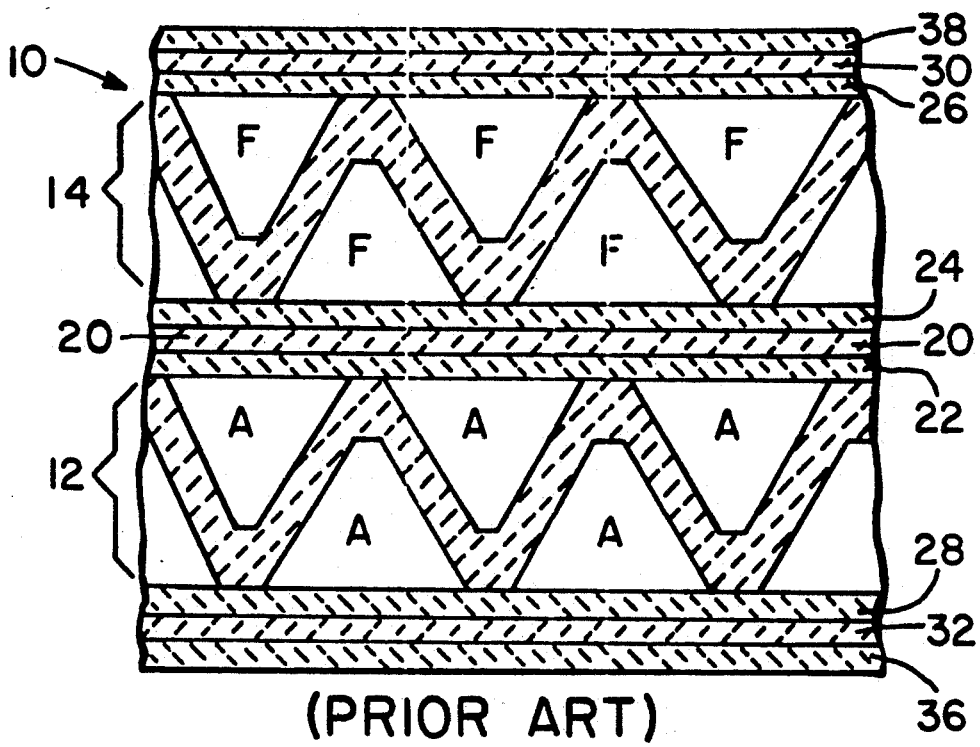
FIG. 1 is a schematic cross-sectional representation of a section of a conventional fuel cell of monolithic design.

The use of flexible pre-sintered electrolyte or other structural layers for the fabrication of fuel cell structures in accordance with the invention offers a number of processing and performance advantages over co-sintering approaches to fuel cell fabrication. Particularly important is the ability to prefabricate and select sintered electrolyte sheet at thicknesses easily adjustable within a range from less than 4 micrometers to 45 micrometers or more, and in compositions which can be optimized for each particular cell design.

As noted in U.S. Pat. No. 5,089,455, expressly incorporated herein by reference, zirconia and a wide variety of related stabilized zirconia compositions, as well as many other oxide and non-oxide ceramic compositions, can be successfully sintered to thin flexible sheet or tape in accordance with the methods therein described. Particular examples of ceramics which can be so processed include, in addition to zirconia and stabilized or partially stabilized zirconia, various oxides selected from the group consisting of hafnia, alumina, $\beta$-alumina, $\beta''$-alumina, silica, titania, mullite, spinel, chromium oxide, zircon, sialon, and nasicon, as well as non-oxides including silicon or titanium carbides and/or nitrides, zirconium carbide, and titanium diboride.

Particularly preferred for fuel cell electrolytes are zirconia and the stabilized zirconias, most particularly stabilized zirconias containing at least one stabilizer selected from the group consisting of yttria ($Y_2O_3$) and calcia (CaO). However, a variety of other stabilizers, including any of the well-known alkaline earth oxide and rare earth oxide stabilizers, may additionally or alternatively be present.

The fabrication of flat thin sheets of ceramic is best achieved in accordance with the preferred method of the aforementioned patent, i.e., by drawing continuous lengths of green sheet through a sintering furnace. Conventional sheet sintering methods, involving the firing of discrete green sheets disposed on setter plates or setter sand, can produce sheet defects such as sheet curling or sheet texturing, due to non-uniform static or dynamic frictional forces arising between the sheet and the support during sintering. More uniform tension and thus improved flatness are obtained by draw sintering as described, both for green sheet and also for sheet which has previously been sintered or partly sintered, but which requires reforming to improve flatness. The sheet to be treated may be continuously drawn from a source such as a spool, and any of a number of conventional supports, including setter plates, tubes, d-tubes or the like, may be used to generate the desired uniform frictional force during sintering.

The use of presintering to provide the electrolyte sheet of the invention is especially advantageous in that the phase assemblage and grain size of the polycrystalline ceramic making up the sheet can be independently controlled. Crystal grain size is an important factor affecting the oxygen ion conductivity of zirconia-based electrolyte materials. Moreover, substantially defect-free sheet can be produced in relatively large sheet sizes where the sheet-forming methods of the aforementioned patent are used.

The formation of flexible pre-sintered electrolytes in long rolls of sintered zirconia or other suitable ceramic will greatly simplify the automation of fuel substructure production. This is a significant improvement over all other electrolyte sheets or tubes which must be processed piece by piece.

It has also been found that zirconia sheet in the thickness ranges preferred for pre-sintered electrolyte layers can readily be reshaped by plastic or superplastic deformation, at or near the sintering temperatures of the ceramic, to provide corrugated or other curved electrolyte base layers having shapes optimized for fuel cell component fabrication. These can serve as substrates for subsequently applied coatings or films of electrode or interconnect materials.

The unusual heat bonding characteristics of pre-sintered electrolyte sheet are also of significant advantage. Hence, these sheets can be permanently bonded to themselves and to other ceramic, cermet and metallic interconnect materials without the use of supplemental sealing materials, simply by low pressure lamination at or near the sintering temperatures of the materials to be bonded. Thus permanent and potentially gas-tight seals can be provided without the use of sealants, if desired, although pre-sintered electrolytes also show excellent compatibility with selected glass sealing frits as hereinafter more fully described.

Lamination is particularly convenient for metallic materials such as metallic cell interconnects, since these may comprise electrical conductor networks not requiring coating or sintering, but simply physical attachment to the electrolyte. The lamination temperatures required for good bonding to pre-sintered electrolytes are relatively low, encompassing a broad range of temperatures even below the sintering temperatures of the pre-sintered electrolyte and materials to be laminated thereto. The preferred temperatures for heat lamination are lamination temperatures $T_L$ as defined by the expression:

$$(T_{LS}-200)<T_L<T_{LM}$$

wherein $T_{LS}$ and $T_{LM}$ are the lowest sintering and lowest melting temperatures, respectively, of the pre-sintered electrolyte and electrode or current conductor to be joined thereto. By the lowest melting temperature is meant the lower of the respective melting temperatures of the materials to be joined, and by the lowest sintering temperature is meant the temperature corresponding to the lower of the respective minimum sintering temperatures of those materials.

Permanent, gas-tight seals between these and other components of the fuel cell structure can also be achieved through the use of compatible glass frit sealants, and the invention additionally provides improved compositions for such glasses which are particularly well adapted to the construction of compliant but strongly bonded fuel cell structures. Families of glass compositions developed for this use include alkali and/or alkaline earth—rare earth—silicate glasses offering thermal expansion coefficients (a values) from about 90 to about $130\times10^{-7}/°C.$, and which can be crystallized in the course of sealing to refractory compounds such as $Na_3YS_3O_9$ (m.p.>1250° C.) whose a values ($\alpha=100\times10^{-7}/°C.$) are also compatible with zirconia-based sheet structures. In addition, the crystallized seals provided by these glasses are sufficiently durable to withstand use in fuel cells at temperatures in 1100°-1200 C. range without seal degradation.

The following composition limits, in mole percent and weight percent, are presently considered to define the range of useful rare earth silicate glasses having the appropriate thermal expansion and sealing characteristics.

| Oxide | Mole % | Weight % |
| --- | --- | --- |
| $Li_2O$ | 0—35 | 0—17.5 |
| $Na_2O$ | 0—35 | 0—30.5 |
| $K_2O$ | 0—35 | 0—40.0 |
| $Cs_2O$ | 0—35 | 0—66.5 |
| Total $R_2O$ ($Li_2O + Na_2O + K_2O + Cs_2O$) | 0—35 | 0—66.5 |
| MgO | 0—20 | 0—13.0 |

-continued

| Oxide | Mole % | Weight % |
|---|---|---|
| CaO | 0—30 | 0—25.0 |
| ZnO | 0—20 | 0—23.5 |
| SrO | 0—40 | 0—47.0 |
| BaO | 0—40 | 0—56.5 |
| Total RO (MgO + CaO + ZnO + SrO + BaO) | 0—40 | 0—56.5 |
| Total $R_2O$ + RO | 7—40 | 1.8—69.0 |
| $Ln_2O_3$ (total of yttria + lanthanide oxides) | 3—18 | 4.5—59.5 |
| $Al_2O_3$ | 0—5 | 0—8.5 |
| $SiO_2$ | 53—75 | 19.5—77.0 |

The lanthanide oxides encompassed within the above range of composition will most preferably comprise rare earth oxides selected from the group consisting of 0–17 mole% $Y_2O_3$ (0–50.0% by weight) and 0–17 mole% $La_2O_3$ (0–59.5% by weight). However, other lanthanides including Ce, Pr, Nd, Pm, Sm, Eu, Gd, Tb, Dy, Ho, Er, Tm, Yb, and Lu may alternatively be used.

Within the above range of glass compositions, replacements of alkali metal oxides with alkaline earth metal oxides yields glasses with somewhat lower a values within the indicated range, and also glasses having somewhat higher softening points. These higher softening points may indicate a somewhat more refractory seal, although this is not always the case since the latter depends primarily on the melting point of the phase(s) that crystallize from the glass rather than the softening point of the glass.

Illustrative examples of dervitrifiable sealing glasses such as above described are reported in Tables 1 and 1a below. The compositions in Table 1 are reported in mole percent, with the same compositions being reported in weight percent in Table 1a. Also provided are data on the thermal expansion coefficients (α values) and softening points of the compositions shown, thermal expansion values being reported as average values over the R.T.–300° C. temperature range and alpha values in units of $10^{-7}/°C$.

TABLE 1

| Sealing Glasses - (mole percent) | | | | | | | | | |
|---|---|---|---|---|---|---|---|---|---|
| | 1 | 2 | 3 | 4 | 5 | 6 | 7 | 8 | 9 |
| $Li_2O$ | — | — | — | — | 10.0 | — | — | — | — |
| $Na_2O$ | 30.0 | 25.0 | 15.0 | 27.5 | 10.0 | 15.0 | 5.0 | — | — |
| $K_2O$ | — | — | — | — | 10.0 | — | 5.0 | — | — |
| $Cs_2O$ | — | — | — | — | 15.0 | — | — | — | — |
| CaO | — | — | 7.5 | — | — | — | — | — | — |
| ZnO | — | — | — | 5.0 | — | — | — | — | — |
| BaO | — | — | 7.5 | — | — | — | 20.0 | 30.0 | — |
| $Y_2O_3$ | 10.0 | 12.5 | 10.0 | 7.5 | 10.0 | 10.0 | 5.0 | 5.0 | — |
| $La_2O_2$ | — | — | — | — | — | — | 5.0 | 5.0 | 10.0 |
| $Al_2O_3$ | — | — | — | — | — | — | 5.0 | — | — |
| $SiO_2$ | 60.0 | 62.5 | 60.0 | 60.0 | 60.0 | 60.0 | 55.0 | 60.0 | 60.0 |

TABLE 1a

| Sealing Glasses - (weight percent) | | | | | | | | | |
|---|---|---|---|---|---|---|---|---|---|
| | 1 | 2 | 3 | 4 | 5 | 6 | 7 | 8 | 9 |
| $Li_2O$ | — | — | — | — | 3.9 | — | — | — | — |
| $Na_2O$ | 24.1 | 19.0 | 11.1 | 23.0 | 8.0 | 8.4 | 3.0 | — | 21.3 |
| $K_2O$ | — | — | — | — | 12.2 | — | 4.5 | — | — |
| $Cs_2O$ | — | — | — | — | 38.3 | — | — | — | — |
| CaO | — | — | 5.0 | — | — | — | — | — | — |
| ZnO | — | — | — | 5.5 | — | — | — | — | — |
| BaO | — | — | 13.7 | — | — | — | 29.4 | 41.9 | — |
| $Y_2O_3$ | 29.2 | 34.7 | 27.0 | 22.8 | 29.2 | 20.5 | 10.7 | 10.3 | — |
| $La_2O_2$ | — | — | — | — | — | — | 15.6 | 14.8 | 37.3 |
| $Al_2O_3$ | — | — | — | — | — | 4.9 | — | — | — |
| $SiO_2$ | 46.6 | 46.2 | 43.0 | 48.6 | 46.7 | 32.7 | 31.7 | 32.8 | 41.3 |
| S.P. (°C.) | 800 | 843 | 828 | 795 | — | 790 | 878 | 959 | — |
| α ($10^{-7}/°C$.) | 117 | 104 | 95.9 | 101 | 115 | 112 | 95.9 | 90.6 | 123 |

The present invention is not restricted to any particular families of electrode, current collector or cell interconnect materials. Thus structures such as are typically formed of wire or mesh of platinum, platinum alloy, silver, or other noble metal, nickel or nickel alloys can be used, as can coatings or patterned layers of these materials or materials such as strontium-doped or magnesium-doped lanthanum chromite, calcium-doped yttrium chromite, and other alkaline earth doped rare earth chromites, or refractory metal cermets. These conductive structures may act as current collectors which are provided on top of, beneath, or along side electrode layers, or they may act as interconnects between electrode layers.

Among the electrode materials useful in combination with pre-sintered electrolytes are cermet materials with 1 to 4 percent inert phase such as nickel/yttria stabilized zirconia cermets, noble metal/yttria stabilized zirconia cermets, these being particularly useful, but not being limited to use, as anode materials. Other materials useful as anode materials include alkaline earth-doped lanthanum chromite, titania-doped and/or ceria-doped yttria stabilized zirconia, conducting perovskites and the like.

Useful cathode materials include such ceramic and cermet materials as strontium-doped lanthanum manganite, calcium-doped yttrium manganite, other alkaline earth-doped lanthanum chromites, cobaltites, and manganites, as well as noble metal/yttria stabilized zirconia cermets. Of course the foregoing examples are merely illustrative of the various electrode and interconnect materials which could be used.

It will be apparent from the foregoing description that pre-sintered electrolytes will be useful in a wide variety of fuel cell designs. These materials have particular utility, however, in the construction of fuel cells of flat plate configuration or of channeled (honeycomb) co-flow or cross-flow configuration. The channelled structures of the present cells are most closely related to the structure of conventional (prior art) monolithic fuel cells, a schematic cross-sectional view of the latter being provided as FIG. 1 of the drawing.

As shown in FIG. 1, a segment 10 of such a cell comprises a channeled (honeycomb) cathode structure 12 and a channeled anode structure 14 joined through an interposed solid oxide electrolyte layer 20. The channels (A) in cathode structure 12 provide flow-through paths for an oxidant such as air, while the channels (F) in anode structure 14 provide similar paths for a fuel gas. Although the illustration shows the parallel channels of a co-flow monolith structure, it will be recognized that the fuel channels could be 90° offset from the oxidant channels, as in conventional cross-flow cells, in order to simplify delivery of the gases to the cell.

Top sheet 22 of the cathode structure and bottom sheet 24 of the anode structure are in contact with opposing surfaces of the solid electrolyte layer 20 to form the completed cell. This electrolyte permits ionic but not electronic conduction between the cathode and anode structures.

Interconnect layers, such as layers 30 and 32, are used to connect cells one to the other. Thus, layer 30 forms a series connection between top anode sheet 26 and bottom cathode layer 38 of an adjoining cell above (not shown) and layer 32 forms a series connection between bottom cathode layer 28 and anode layer 36 of an adjoining cell below (not shown).

Conventionally, at least flat cathode-electrolyte-anode sheet structures such as sheet 22-20-24 of monolithic fuel cells of this design are joined as green ceramic sheet elements and are then co-sintered to form a bonded sheet substructure comprising the electrolyte and opposing electrodes. This approach limits not only the compositions and thicknesses of the layers but also the quality of the layers. Further, defects in the layers, most critically in the electrolyte layer, can necessitate the replacement of the entire electrolyte substructure.

Also disadvantageous in monolithic configurations of this type is the fact that considerable thermal stresses may arise, even if all components have the same coefficient of thermal expansion, due to thermal gradients across the cell structure. These difficulties are compounded in most fuel cell designs because the various layers offering the best combination of electrical properties are generally not of the same composition and thermal expansion characteristics, and yet must be combined into a single monolithic structure. As a consequence, monolithic solid oxide fuels cells of this type have had to be gradually and uniformly heated to and from operating temperatures over intervals of many hours in order to avoid thermal stress damage to interconnect and/or electrolyte components of the cell.

Through the use of fuel cell components incorporating flexible pre-sintered electrolytes, it is possible to reduce the thermal stresses which give rise to such failure. This is most directly achieved through the mechanism of Euler buckling, which can act to relieve the tensile stresses most often responsible for the failure of brittle ceramic and cermet materials. Tensile stresses are developed in the cooler regions of brittle materials subjected to uneven heating, due to compressive stresses arising in the hotter regions. Euler buckling allows the compressive stresses in the heated region to be relieved by buckling which can, in turn, greatly reduce the tensile stress in the colder portions of material. In this way the development of tensile stresses in a ceramic or cermet which exceed the modulus of rupture strength thereof can often be avoided.

The use of thin pre-sintered electrolyte sheet enhances the effectiveness of Euler buckling as a stress relief mechanism in these structures, even though the general design of fuels cells such as shown in FIG. 1 acts to limit the amount of flexing available. The electrolyte sheets themselves exhibit very high thermal shock resistance, and porous ceramics or cermets may exhibit somewhat higher failure strains than dense, non-porous material of the same composition. Thus, the use of porous cathode and/or anode layers of relatively slight thickness, in combination with flexible pre-sintered electrolyte layers, can provide a fuel cell structure which is significantly more compliant than prior art planar structures.

The extent to which compliance must be built into a particular fuel cell design will depend upon the particular environment in which the cell is to be used. Thus electrolyte/electrode and/or interconnect substructures provided in accordance with the invention may be more or less compliant depending on the need.

Illustrative of this variable is the example of an electrolyte/electrode substructure based on a flexible, pre-sintered electrolyte sheet of yttria-stabilized zirconia ($ZrO_2 + 8$ mole % $Y_2O_3$), having a thickness of about 20 micrometers. This structure further includes a porous nickel/yttria-stabilized zirconia (8 mole % $Y_2O_3$) cermet anode of 50 micrometers thickness bonded to one surface of the electrolyte and a porous strontium-doped lanthanum manganite ($LaMnO_3$) cathode of 50 micrometers thickness bonded to the other electrolyte surface. The resulting electrolyte/electrode substructure exhibits improved compliance due to the excellent flexibility and toughness of the electrolyte, although the relatively thick electrode layers used (yielding an overall thickness of about 120 micrometers) somewhat limit the ultimate flexibility thereof.

An example of a more compliant fuel cell substructure in accordance with the invention is an electrode/electrolyte composite based on a similar pre-sintered stabilized zirconia electrolyte, but with a sheet thickness of 18 micrometers, and supporting porous electrodes of 10–20 micrometers thickness. The electrodes for this structure may comprise porous platinum/zirconia layers, these being applied by coating opposing electrolyte surfaces with a paste comprising 33 volume % of yttria-stabilized zirconia ($ZrO_2 + 6$ mole% $Y_2O_3$) and 67 volume % of a conventional platinum ink. The ink used is A-4338 platinum ink, commercially available from the Engelhard Corporation of East Newark, N.J. Firing to convert the paste to porous electrodes is carried out at 1050° C. The resulting electrolyte/electrode substructure is found to have flexibility sufficient to permit bending to a radius of curvature of approximately 5 mm without damage to the pre-sintered electrolyte or electrode coatings.

Figure 2:
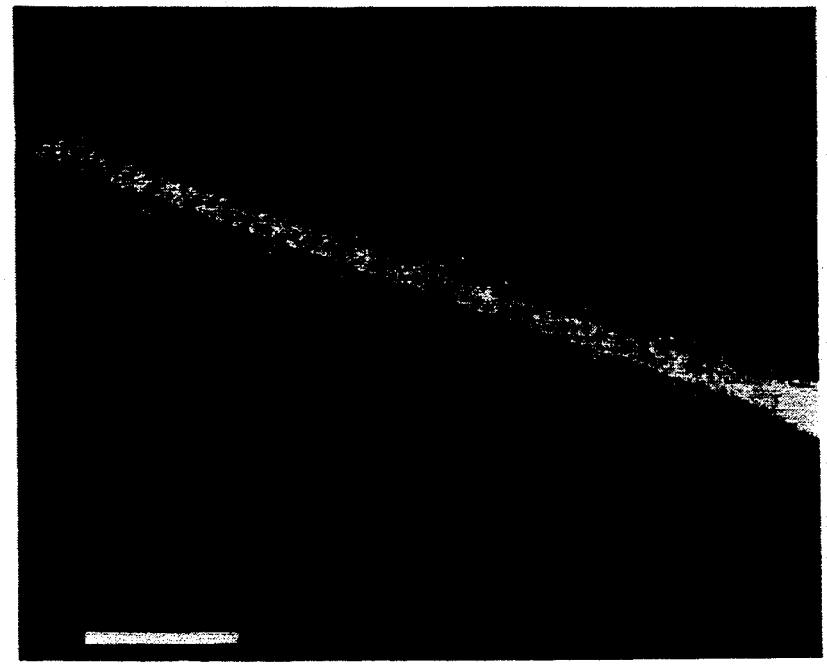
FIG. 2 is an optical photomicrograph of a thin, flexible electrolyte/electrode substructure of the invention.

FIG. 2 of the drawing is an optical photomicrograph of a flexible electrode/electrolyte substructure of this configuration, taken at a magnification of 200x, which clearly shows the thin multilayer structures achievable following this procedure. It will be appreciated that defect-free electrolyte-electrode substructures with this level of compliance are extremely difficult to produce utilizing co-sintering approaches, due to the high layer shrinkages generally inherent in such processes.

Calculations verify that the level of bending shown by the substructure of FIG. 2 produces a relatively large strain (in excess of 0.3%) at the exterior surface of the outermost electrode, this strain being well above typical failure strain values for most dense ceramics (0.1%). Thus compliance in this case is favored by positioning the porous electrode layers at the outer surface of the substructure, as well as by the flexibility and strength of the supporting electrolyte.

Based on these considerations, some general design principles to be observed for best flexibility and compliance in the fuel cell design include, in addition to the use of a highly flexible yet strong pre-sintered electrolyte base layer, the positioning of dense, brittle, and therefore strain-intolerant ceramics or cermets as close to the neutral axis (center plane) of the layered substructure as possible. Further, the use of strain-tolerant components (eg., porous ceramic or dense-to-porous metallic or cermet layers) at the critical tensile locations in the composite will be advantageous.

The following examples illustrate the further use and function of flexible pre-sintered electrolyte sheet in the design of fuel cells and fuel cell substructures.

EXAMPLE 1—ELECTROLYTE/ELECTRODE SUBSTRUCTURE

A thin, compliant electrolyte/electrode substructure illustrating the versatility of the use of pre-sintered flexible electrolytes is constructed. To prepare this structure, a flexible electrolyte sheet composed of yttria-stabilized zirconia ($ZrO_2$—6 mole% $Y_2O_3$) is first edge-constrained by bonding it across the open base of a rigid stabilized zirconia tube approximately 2.2 cm in inside diameter.

Permanent bonding to the tube is achieved by applying a sodium-yttrium silicate sealing glass frit to the tube base and sheet, followed by firing the tube and sheet together at a sealing temperature of 1225° C. The sealing frit used has a composition, in weight percent, of about 24.1% $Na_2O$, 29.3% $Y_2O_3$ and 46.6% $SiO_2$, being reported as Example 1 in Tables 1 and 1a above.

After the electrolyte sheet has been sealed to the tube, a platinum ink for a cell cathode is applied to the surface of the electrolyte facing the interior of the tube and a nickel/stabilized zirconia paste for a cell anode is applied to the bottom or exterior face of the electrolyte sheet. The platinum ink is formulated by diluted 0.45 g of a commercially available platinum ink (Engelhard A4338 platinum ink) with 0.20–0.45 g of butyl acetate. The nickel/zirconia paste consists of about 20 g nickel powder, 0.24 g of dibutyl phthalate, 2.67 g butyl acetate, 1.01 g poly(butyl methacrylate),and 6.1 g of a zirconia slip. The zirconia slip is composed, in parts by weight, about 100 parts of yttria-stabilized zirconia (6 mole % $Y_2O_3$), 80 parts butyl acetate, and 0.6 parts Emphos PS21A dispersant.

The coated sample produced as described is next fired to 1100° C. in forming gas (8% hydrogen) for 1 hour to cure the paste coatings to porous electrode coatings. The final coatings are each approximately 10 to 30 micrometers in thickness.

In this design, the thermal expansion of the platinum-based cathode coating is about 8.6 ppm/°C. while the thermal expansion of the nickel-based anode is approximately 13.3 ppm/°C. despite this large difference in thermal expansion coefficient, however, and partly due to the strength and flexibility of the electrolyte, no cracking or other defects in the electrolyte/electrode substructure following curing of the electrode layers are observed.

A variety of bonding methods, including but not limited to coating, frit bonding, brazing, or the like, can be used to combine electrolyte sheets and electrodes or interconnect components into cell assemblies in accordance with the invention. However, a particularly suitable method for attaching metallic cell interconnects, which achieves direct bonding to the electrolyte without the use of supplemental glass frit or other sealants, is that of low-pressure lamination. The following example is illustrative.

EXAMPLE 2—ELECTROLYTE/INTERCONNECT STRUCTURE

An electrically conductive metal element for a cell current collector or interconnect component is first selected. This element comprises a section of nickel mesh approximately 2.3 cm by 1.6 cm in size, commercially available as Delker 3Ni5-077AN nickel mesh from the Delker Corporation of Branford, Conn.

The mesh conductor thus provided is next laminated to a section of flat, flexible, pre-sintered yttria-stabilized zirconia sheet ($ZrO_2$ plus 6 Lamination is accomplished by positioning the mesh on the flexible electrolyte sheet, placing a separation layer of tape-cast unsintered alumina over the mesh, placing the electrolyte, mesh, and separation layer between sintered alumina platens, applying a weight of about 620 g to the stack, and then heating the weighted assembly to a temperature of about 1250° C. for 30 minutes in a vacuum furnace. Following this lamination procedure the stack is cooled, removed from the furnace and disassembled. Examination of the laminated electrolyte/interconnect structure thus provided reveals that intimate bonding of the mesh to the ceramic sheet at all mesh intersections and a substantial proportion of connecting segments has been achieved. Moreover, due to the compliance of this structure, relief of stress in the composite is readily effected by a flexing or curling of the assembly toward the sheet surface to which the mesh is bonded. Thus a durable, compliant composite is obtained notwithstanding the significant difference in thermal expansion between the nickel mesh (approximately 13.3 ppm/°C.) and the stabilized zirconia sheet (approximately 11 ppm/°C.).

Figure 3:
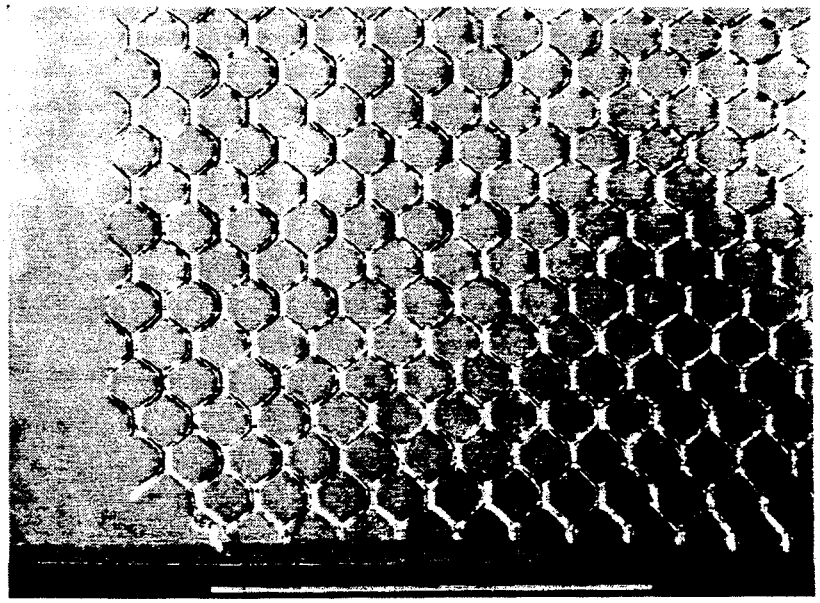
FIG. 3 is an optical photomicrograph of a thin, flexible electrolyte/interconnect substructure of the invention.

FIG. 3 of the drawing is an optical photomicrograph illustrating an electrolyte/current collector substructure provided in accordance with the above procedure, wherein the white bar corresponds to a dimension of about 1 cm.

EXAMPLE 3—ELECTROLYTE/INTERCONNECT STRUCTURE

The procedure of Example 2 is repeated, but substituting an interconnect element consisting of a section of stainless steel mesh for the nickel mesh of that example. The element selected is a 2 cm by 1.5 cm section of 316L stainless steel mesh, commercially obtainable as Delker 3SS(316L)10-125AN mesh from the Delker Corporation, Branford, Conn.

Examination of the laminated assembly after completion of the lamination heat treatment as in Example 2 again reveals that excellent bonding between the mesh and the flexible zirconia electrolyte sheet is achieved. Moreover, despite the relatively large difference in thermal expansion between the interconnect material and the electrolyte sheet (approximately 17.5 ppm/°C. for the steel versus approximately 11 ppm/°C. for the zirconia sheet), the process of lamination does not produce any cracking or other apparent defects in the bonded structure. Again, stress relief is realized in this compliant structure by curling of the assembly toward the electrolyte surface to which the mesh is bonded.

Presintered electrolytes also offer advantages for the attachment of electrical leads, due to their strength and toughness in thin sheet form. Several methods for the attachment of metal leads may be used, including bonding to the electrolyte with a glass or ceramic frit, direct brazing, or lamination such as employed for the attachment of cell interconnect structures. Illustrative of the expedience of such attachment, a platinum wire approximately 0.1 mm in diameter may be bonded to a pre-sintered zirconia electrolyte sheet by simply contacting the sheet with the wire and heating the junction with a gas-oxygen torch. The platinum partially melts and bonds directly and strongly to the sheet. Subsequent separation of this electrical lead from the sheet can only by accomplished by fracturing the sheet.

EXAMPLE 4—FUEL CELL CONSTRUCTION

A hypothetical example of a fuel cell structure incorporating compliant cell substructures such as above described is as follows. A quantity of pre-sintered electrolyte sheet composed of yttria-stabilized zirconia, i.e., zirconia containing 4–12 mole percent of a $Y_2O_3$ stabilizer, typically 6 mole% $Y_2O_3$, is first provided. This sheet is flexible, having a thickness in the 5–45 micrometer range, 20-micrometer sheet being particularly suitable.

Sections of this pre-sintered sheet first provided with cathode current collectors (cathode grids) on one side of each sheet. These grids consist of parallel lines of platinum metal, suitably having a thickness of 1 to 50 microns, e.g., 20 micrometers, a line spacing of 1 to 10 mm, such as 5 mm, and a line width of 10 to 500 micrometers, typically 200 micrometers. These lines are readily formed by printing on the electrolyte sheet with platinum ink, followed by sintering of the ink at 1000°–1200° C. Methods such as vapor deposition or lamination of platinum foil to the electrolyte surface could alternatively be used for the same purpose.

Following application of the platinum current collectors, cathode layers are applied to fill the intersections between current collectors by paste coating and firing. The cathode layers are formed of strontium-doped lanthanum manganite, applied as a powder dispersion in an organic vehicle and fired at 1200°–1400° C. to convert the paste layers to porous cathode layers.

After the cathode structures have been applied to the first side of each electrolyte sheet, anodes are applied to the sheet surfaces opposite the cathodes. For this purpose, the second surfaces of each sheet are first laminated with nickel mesh at a lamination temperature of 1250° C., as described above in Example 2, to permanently bond the mesh to the sheet. This mesh will serve as a current collector for the anode side of the electrolyte sheet.

After the anode current collector (anode grid) has been applied, an electrode material for the anode, consisting of a mixture of nickel and zirconia and provided as a paste dispersion of powder in an organic vehicle base, is applied over the nickel mesh in a quantity sufficient to fill the openings in the mesh. This anode material, which may comprise 1–80 volume % of stabilized zirconia, e.g., 20 % by volume of $ZrO_2$ – 6 mole % $Y_2O_3$ powder, and 80% by volume of powdered nickel, is fired to a temperature in the range of about 900°–1400° C., such as 1100° C., to convert the paste to a porous nickel-zirconia cermet anode.

Figure 4:
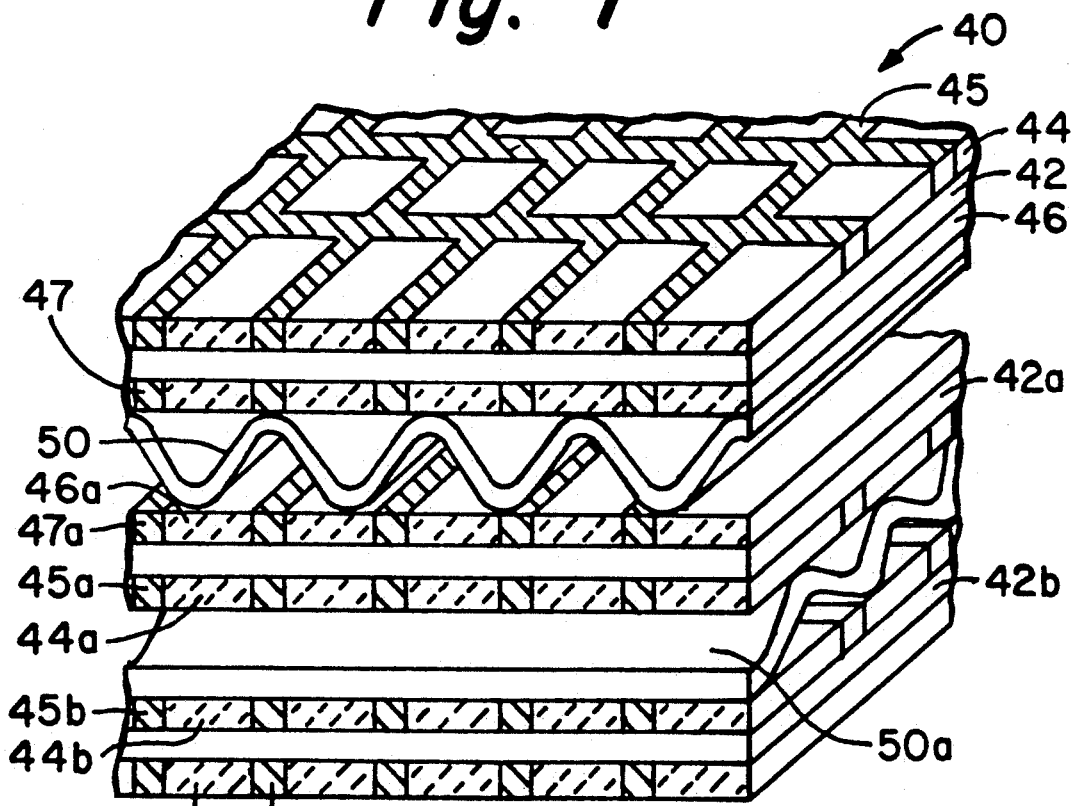
FIG. 4 is a schematic cross-sectional representation of a section of a fuel cell design within the scope of the invention.

The compliant electrolyte/electrode substructures with integral current collectors thus provided are combined into a fuel cell of channeled cross-flow design, with a final configuration such as schematically illustrated in FIG. 4 of the drawing. Referring more particularly to FIG. 4, fuel cell structure 40 includes a first substructure based on flexible electrolyte sheet 42, that sheet having anode layer 44 containing anode grid 45 bonded to its top surface and cathode layer 46 incorporating cathode grid 47 bonded to its bottom surface.

Additional electrolyte/electrode substructures also included within cell structure 40 comprise flexible electrolyte sheets 42a and 42b. These have, respectively, anodes 44a and 44b incorporating anode grids 45a and 45b bonded to the anode surfaces thereof, and cathodes 46a and 46b with integral cathode grids 47a and 47b bonded to the opposing surfaces thereof.

The fuel cell structure further includes cell separators consisting of corrugated sheets, 50 and 50a, in this case composed of sintered ceramic material, which function to separate the electrolyte/electrode sheets from each other and to provide access to the electrodes by the fuel and oxidant materials. In the preferred configuration shown, the sheets are composed of pre-sintered, flexible, corrugated yttria-stabilized zirconia sheets having a thickness below about 45 micrometers, ie., 20 micrometers.

Sealing of the cell components into a gas-tight assembly may be achieved utilizing a glass sealing frit, typically a sodium-yttrium-silicate frit such as hereinabove described. Such frit sealing is particularly desirable to achieve gas-tight seals, for example, between at least the peripheral edges of the electrolyte/electrode substructures and the corrugated cell separators.

In the operation of this cell, the oxidant is introduced between the cathode surfaces 46 and 46a through the channels provided by the corrugated sintered ceramic sheet 50. Similarly, the fuel is introduced between the anode surfaces 44a and 44b through the channels provided by the corrugated sintered ceramic sheet 50a. The current is collected via the anode grids 45, 45a and 45b and the cathode grids 47, 47a and 47b. Connection of this cell structure to an external circuit may be by any suitable means, such as by electrical leads attached to each of the anode and cathode current collectors and connecting those electrodes in series or parallel to positive and negative cell terminals of conventional design.

Edge sealing of multilayer fuel cell structures may also be advantageously achieved through the use of additional flexible ceramic material, which in appropriate configurations can provide for the manifolding of cell channels as well as flexible sealing of the structure. Thus, using the example of the structure of FIG. 4, adjacent half-cells could be joined and manifolded by sealing half-cylinders of flexible ceramic sheet to adjoining electrolyte layers in the structure. One long edge of such a half-cylinder could be bonded to one electrolyte layer (e.g., layer 42a in FIG. 4), while the other long edge could be bonded to an adjacent electrolyte layer (e.g., layer 42b). The resulting seal would be flexible, yet could provide for gas access to all of the channels formed by a corrugated sheet cell separator between the electrolyte substructures (e.g., sheet 50a in FIG. 4).

The utilization of compliant corrugated separators and flexible electrolyte base sheets in the cell construction described imparts much improved thermal shock resistance to the finished cell structure. Illustrative of the thermal durability of these compliant ceramics, it has been found that platinum-coated flexible pre-sintered zirconia sheet of the kind utilized for the electrolyte and separator components in this cell design can be heated to temperatures in excess of 1000° C. over heating intervals on the order of 1 second without thermal damage to the sheet, platinum, or platinum/sheet bond. Hence, with cell designs such as described, it is anticipated that rapid heating of the fuel cell without structural damage, for example by passing a high current through the cathode or anode grids, should be readily achievable.

While the invention has been particularly described above with respect to specific examples of compositions, materials, apparatus and/or procedures, it will be recognized that those examples are presented for purposes of illustration only and are not intended to be limiting. Thus numerous modifications and variations upon the structures, materials and processes specifically described herein will have obvious application to the design of compliant fuel cell structures, and may thus be resorted to by those skilled in the art within the scope of the appended claims.

We claim:

1. A solid electrolyte fuel cell comprising an oxidant reservoir, a fuel reservoir, and an electrolyte structure interposed between the oxidant and fuel reservoirs, wherein the electrolyte structure includes an oxygen-ion-conductive electrolyte comprising a thin, flexible, pre-sintered, polycrystalline ceramic sheet.

2. A fuel cell in accordance with claim 1 wherein the electrolyte is formed of a pre-sintered oxide ceramic of high oxygen ion conductivity.

3. A fuel cell in accordance with claim 2 wherein the major component of the pre-sintered oxide ceramic sheet is zirconium oxide.

4. A fuel cell in accordance with claim 1 which further comprises a gas channeling component for controlling fuel or oxidant flow in the cell, and wherein the gas channeling component is formed of a second flexible pre-sintered polycrystalline ceramic sheet.

5. A fuel cell in accordance with claim 4 wherein the electrolyte and/or the gas channeling component have thicknesses not exceeding about 45 micrometers.

6. A fuel cell in accordance with claim I wherein the pre-sintered polycrystalline ceramic sheet is directly bonded to an electrode or current conductor.

7. A thermal-shock-resistant fuel cell comprised of a combination of flat or curved and corrugated ceramic sheets forming a channeled fuel cell structure, wherein at least one of the sheets is a flexible pre-sintered ceramic sheet.

8. A thermal-shock-resistant fuel cell in accordance with claim 7 rein the flexible pre-sintered ceramic sheet is a flat or curved electrolyte sheet composed of an oxygen-ion-conducting ceramic oxide.

9. A thermal-shock-resistant fuel cell in accordance with claim 8 wherein the electrolyte sheet is provided as a component of a compliant electrolyte substructure, and wherein the substructure further comprises at least one additional fuel cell circuit component selected from the group consisting of fuel cell electrodes and fuel cell current conductors bonded directly to the electrolyte sheet.

10. A thermal-shock-resistant fuel cell in accordance with claim 9 wherein the circuit component is selected from the group consisting of a porous anode layer, a porous cathode layer, and a metallic, ceramic, or cermet current collector.

11. A thermal-shock-resistant fuel cell in accordance with claim 9 wherein the compliant electrolyte substructure comprises a porous anode layer bonded to a first surface of the electrolyte sheet and a porous cathode layer bonded to a second surface of the electrolyte, and wherein the thickness of the electrolyte substructure does not exceed about 150 micrometers.

12. A thermal-shock-resistant fuel cell in accordance with claim 11 wherein the corrugated sheets comprise flexible pre-sintered polycrystalline ceramic sheets.

13. A thermal-shock-resistant fuel cell in accordance with claim 7 wherein the flat sheets and/or the corrugated sheets are bonded to adjoining fuel cell components by means of a thermally crystallizable rare earth-alkali/alkaline earth-silicate sealing glass.

14. A thermal-shock-resistant fuel cell in accordance with claim 13 wherein the sealing glass comprises, in mole percent, about 0–35% $R_2O$, wherein $R_2O$ consists of alkali metal oxides, 0–40% RO, wherein RO is selected from the alkaline earth metal oxides and ZnO, 7–40% total of $R_2O+RO$, 3–18% $Ln_2O_3$, wherein $Ln_2O_3$ consists of rare earth metal oxides selected from the lanthanide series of rare earth metals and yttrium, 0–5% $Al_2O_2$, and 53–75% $SiO_2$.

* * * * *

UNITED STATES PATENT AND TRADEMARK OFFICE
CERTIFICATE OF CORRECTION

PATENT NO. : 5,273,837

DATED : December 28, 1993

INVENTOR(S) : Bruce G. Aitken et al.

It is certified that error appears in the above-identified patent and that said Letters Patent is hereby corrected as shown below:

Col. 1, line 28, "$LaCrO_2$" should be "$LaCrO_3$"

Col. 4, line 44, "$SO_2$" should be "$SiO_2$"

Col. 8, line 26, "$T_{LN}$" should be "$T_{LM}$"

Col. 8, line 46, "(a values)" should be "($\alpha$ values)"

Col. 8, line 49, "$Na_3YS_3O_9$" should be "$Na_3YSi_3O_9$"

Col. 8, line 49, "a" should be "$\alpha$"

Col. 9, line 23, "a" should be "$\alpha$"

Col. 9, line 31, "dervitrifiable" should be "devitrifiable"

Col. 9, line 52, "$La_2O_2$" should be "$La_2O_3$"

Col. 9, line 66, "10.7" should be "10.8"

UNITED STATES PATENT AND TRADEMARK OFFICE
CERTIFICATE OF CORRECTION

PATENT NO. : 5,273,837
DATED : December 28, 1993
INVENTOR(S) : Bruce G. Aitken et al.

It is certified that error appears in the above-identified patent and that said Letters Patent is hereby corrected as shown below:

Col. 9, line 67, "$La_2O_2$" should be "$La_2O_3$"

Col. 10, line 27, "4" should be "40"

Col. 13, line 29, "A4338" should be "A-4338"

Col. 13, line 45, "despite" should be "Despite"

Col. 14, line 5, after "6" insert "mole % $Y_2O_3$), the sheet being about 20 micrometers in thickness."

Col. 14, line 57, "Presintered" should be "Pre-sintered"

Col. 17, line 31, "I" should be "1"

Col. 17, line 40, "rein" should be "wherein"

UNITED STATES PATENT AND TRADEMARK OFFICE
CERTIFICATE OF CORRECTION

PATENT NO. : 5,273,837

DATED : December 28, 1993

INVENTOR(S) : Bruce G. Aitken, et al

It is certified that error appears in the above-indentified patent and that said Letters Patent is hereby corrected as shown below:

Col. 18, line 39, "$Al_2O_2$" should be "$Al_2O_3$"

Signed and Sealed this

Sixteenth Day of August, 1994

*Attest:*

BRUCE LEHMAN

*Attesting Officer*     *Commissioner of Patents and Trademarks*